(12) United States Patent
Jessup

(10) Patent No.: US 6,794,882 B2
(45) Date of Patent: Sep. 21, 2004

(54) RUPTURE DETECTOR FOR WINDSHIELD ASSEMBLY

(75) Inventor: Shaun E. Jessup, Madison, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 61 days.

(21) Appl. No.: 10/208,448

(22) Filed: Jul. 30, 2002

(65) Prior Publication Data

US 2004/0021453 A1 Feb. 5, 2004

(51) Int. Cl.[7] .............................................. G01R 31/08
(52) U.S. Cl. ..................................... 324/522; 219/509
(58) Field of Search ........................... 324/522; 219/509

(56) References Cited

U.S. PATENT DOCUMENTS

| | | | |
|---|---|---|---|
| 3,825,917 A | | 7/1974 | Lucky ........................ 340/274 |
| 4,565,919 A | * | 1/1986 | Bitter et al. ................. 219/509 |
| 4,808,799 A | * | 2/1989 | Schave ........................ 219/522 |
| 4,829,163 A | * | 5/1989 | Rausch et al. ............... 219/547 |
| 4,902,275 A | | 2/1990 | Fassbind ........................ 604/1 |
| RE33,343 E | * | 9/1990 | Bitter et al. ................. 219/509 |
| 4,994,650 A | | 2/1991 | Koontz ........................ 219/497 |
| 5,208,444 A | * | 5/1993 | Winter et al. ............... 219/547 |
| 5,389,911 A | | 2/1995 | Madau ........................ 340/426 |
| 5,543,601 A | * | 8/1996 | Bartrug et al. ............... 219/203 |
| 5,824,993 A | * | 10/1998 | Chrysochoos et al. ...... 219/203 |
| 6,020,576 A | * | 2/2000 | Shiah et al. ................. 219/501 |
| 6,346,314 B1 | | 2/2002 | Chaumel et al. ............ 428/195 |
| 2002/0021481 A1 | * | 2/2002 | Lin et al. ..................... 359/265 |

FOREIGN PATENT DOCUMENTS

| | | | |
|---|---|---|---|
| EP | 0 418 123 A1 | 6/1990 | ........... B32B/17/10 |
| FR | 2 625 581 | 7/1989 | ........... G08B/13/04 |

OTHER PUBLICATIONS

U.S. patent application Publication, US 2002/0021481 A1, Feb. 21, 2002; Electrochromic Transparency Incorporating Security System, Lin et al.

* cited by examiner

Primary Examiner—Charles H. Nolan, Jr.
(74) Attorney, Agent, or Firm—Andrew C. Siminerio

(57) ABSTRACT

A rupture detector for a windshield assembly having one or multiple transparent members. The rupture detector includes a conductive member attached to a portion of the transparent member. An electrical power source in communication with the conductive member applies an electrical potential to the conductive member, and an electrical measurement mechanism is in communication with the conductive member and measures the electrical potential of the conductive member. A windshield assembly is also disclosed.

38 Claims, 2 Drawing Sheets

RUPTURE DETECTOR FOR WINDSHIELD ASSEMBLY

BACKGROUND OF THE INVENTION

1. Field of the Invention

The present invention relates generally to failure or rupture detection mechanisms and, in one particular embodiment, to a rupture detector for a windshield assembly.

2. Technical Considerations

Windshield assemblies are used in various transportation-related fields for providing a vehicle operator with a clear view of the intended path of travel, while preventing environmental, physical and other impacts and/or interactions. For example, windshield assemblies are used in cars, trucks, buses, trains, aircraft, etc. These windshield assemblies must meet specific design requirements and specifications since a failure of the windshield could cause immediate harm and injury to the vehicle operator, vehicle passengers and others around the vehicle.

Vehicle transparencies, such as windshield assemblies, for high-speed transportation operations, such as aircraft or high-speed transit systems, require higher structural and safety measures due to the high speeds attained in these modes of transportation. Therefore, aircraft and high-speed transit system windshield assemblies are typically laminated assemblies having multiple interlayer material plies interposed between transparent rigid plies. These rigid plies can be glass or any other well-known substitutes, such as polycarbonates, acrylic resins, polyesters, and rigid transparent polyurethanes. This laminated structure provides the windshield with strength and flexibility.

In high-speed transportation operations, a failure of the vehicle transparency, e.g., windshield assembly, is particularly harmful not only to the operator but to the multiple passengers traveling within the vehicle. In the case of aircraft, a failure of the windshield assembly could cause depressurization of the cabin, force immediate landing (regardless of location) or could lead to the injury of both the operators and the passengers.

Due to the hazards presented by a failure or rupture in a vehicle transparency, e.g., windshield assembly, in these high-speed applications, the early detection of the onset of such a failure is particularly desirable. If a failure or rupture of a windshield assembly is detected early enough, the vehicle can be brought to a safe condition in a quicker manner or, alternatively, this early detection allows for early mitigation, thus increasing vehicle safety.

2b. Patents of Interest

U.S. Pat. No. 6,346,314 to Chaumel et al. teaches a device for locating a rupture in a transparent panel having multiple panes using an opaque or semi-opaque obstacle. This obstacle provides the vehicle operator with a visual indication of a windshield failure or break and further allows the operator to identify which pane has ruptured.

U.S. Pat. No. 4,994,650 to Koontz teaches an electric field detector for a heatable windshield and includes detector lines extending around a perimeter of the windshield. These detector lines are electrically interconnected to the windshield coating. As current passes through a coating on the windshield, voltage in the coating is monitored and interrupted in response to certain variations, for example a bus bar power lead failure.

U.S. Pat. No. 4,902,875 to Koontz teaches a power discontinuity sensor for a dual feed heatable windshield with bus bars having a double lead arrangement. Sensor lines extend adjacent the leads and are provided with current. Voltage in the lines is monitored and current to the bus bar is interrupted in response to certain variations.

SUMMARY OF THE INVENTION

It is, therefore, an object of the present invention to provide a rupture detector for a vehicle transparency, e.g., a windshield assembly, to detect a break or rupture in a layer of the windshield assembly, such as resulting from environmental or physical impact. It is another object of the present invention to provide a rupture detector that detects a break or rupture individually for multiple layers in a windshield assembly or different portions of a specific ply. It is yet another object of the present invention to provide a rupture detector for a windshield assembly that can be used in connection with any conventional windshield assembly, for example a "plug-in" or clamp-type windshield assemblies in an aircraft application The present invention provides a rupture detector for detecting a rupture of a vehicle transparency, e.g., a windshield assembly, having one or multiple plies, e.g., transparent members. The rupture detector includes an electrically conductive member or strip attached to at least a portion of each or any individual transparent member. An electrical power source is in communication with the conductive member and applies an electrical potential to the conductive member. An electrical measurement mechanism, also in communication with the conductive member, measures the electrical potential of the conductive member. In one embodiment, the electrical power source is capable of applying known or predetermined current or voltage to the conductive member, and the electrical measurement mechanism is capable of reading the current or voltage and calculating the resistance. During a rupture or failure condition, as a crack or break passes into or through the conductive member, the resistance approaches and, when totally separated, reaches infinity, thereby indicating that a rupture has occurred. In one embodiment, the conductive member is a conductive band or coating extending around at least a portion of an outer periphery of the transparent member.

The present invention is also directed to a vehicle transparency, e.g., a windshield assembly, including one or multiple transparent members and a rupture detector. The rupture detector includes a conductive member or strip attached to at least a portion of each or any individual transparent member. An electrical power source is in communication with the conductive member and applies an electrical potential to the conductive member. An electrical measurement mechanism, also in communication with the conductive member, measures the electrical potential of the conductive member. The present invention is also directed to a method of detecting a rupture condition in a transparent member of a windshield assembly.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

Figure 1:
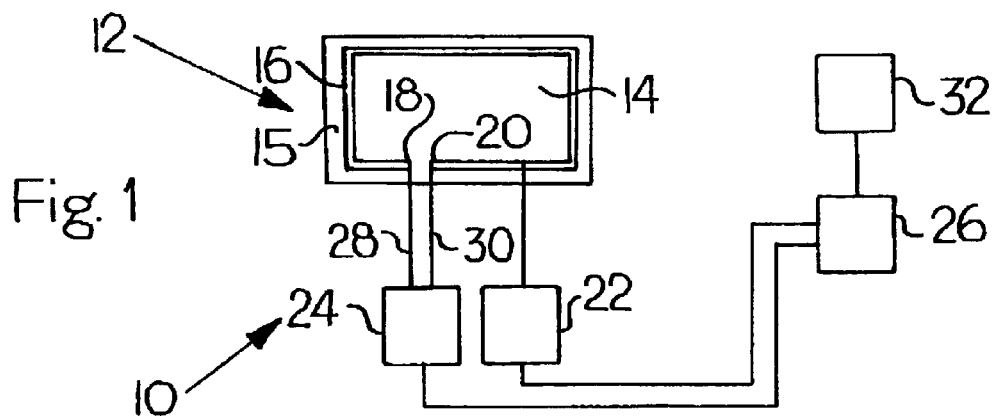
FIG. 1 is a schematic view of an exemplary windshield assembly having a rupture detector incorporating features of the present invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. The terms "deposited over" or "provided over" mean deposited as provided on a surface but not necessarily in direct contact with the surface. For example, a coating "deposited over" a substrate does not preclude the presence of one or more other coating films of the same or different composition located between the deposited coating and the substrate. As used herein, the term "transparent" means having a visible light transmittance of greater than 0% up to 100%. By "visible light" is meant electromagnetic energy in the range of 380 nanometers (nm) to 800 nm.

Various numerical ranges are disclosed in this patent application. Because these ranges are continuous, they include every value between the minimum and maximum values. Unless expressly indicated otherwise, the various numerical ranges specified in this application are approximations.

The general concepts of the invention will now be described with specific reference to use with a vehicle windshield assembly. However, it is to be understood that the invention is not limited to vehicle windshields but could be practiced with any vehicle transparency, such as rear lights, side lights, moon roofs, sunroofs, viewing parts for underwater vehicles, and passenger windows on aircraft and high speed trains, just to name a few. Additionally, the invention is not limited to use with vehicle transparencies but could also be practiced with architectural transparencies, such as windows and insulating glass units.

Exemplary embodiments of a rupture detector 10 of the invention with non-limiting exemplary windshield assemblies 12 are illustrated in FIGS. 1–6. In a broad practice of the invention and as shown in FIG. 1, a windshield assembly 12 includes at least one transparent member 14 having an outer periphery extending around an edge of the major surface 15 and an area immediately adjacent this edge. In one non-limiting embodiment, the rupture detector 10 includes an electrically conductive member 16 extending along or around substantially the entire outer periphery of the major surface 15 of the transparent member 14, thereby forming a strip or band of conductive material around the major surface 15 of the transparent member 14. However, in a nonlimiting alternative configuration, the conductive member 16 extends along at least a portion of the outer periphery of the windshield assembly 12, for example along at least 50% of the window outer periphery, or along at least 75% of the window outer periphery, or along at least 90% of the window outer periphery, etc., depending upon the application.

Since the conductive member 16 can decrease visibility through that portion of the member 14 over which it is deposited, the maximum width of the conductive member 16 depends upon the required or specified operator viewing area through the transparent member 14. If the conductive member 16 extends too far over the surface of the transparent member 14 (i.e., if the width of the conductive member is too wide or member 16 is positioned too far into the central portion of transparent member 14), the operator's view through the transparent member 14 could be partially obstructed by that portion of the conductive member 16 extending into the operator's viewing area. Many vehicles, for example, aircraft, have specific safety requirements specifying the viewable (or transparent) area required. However, if the conductive member 16 is formed from a substantially or fully transparent material that still has the required conductive properties, the placement of the conductive member 16 with respect to the transparent member 14 would be highly variable. For example, in other non-limiting embodiments, the conductive member 16 could form an inner or small strip or band more centrally located on the transparent member 14. Alternatively, the conductive member 16 could include multiple and concentric strips or bands emanating from a center of the transparent member 14 outwardly towards the transparent member 14 outer periphery. Alternatively still, the conductive member 16 could be in the form of an "X" or other shape, depending upon the anticipated nature and course of a rupture or break in the transparent member 14. In order to enhance rupture location, multiple conductive members 16 can be placed in a grid or array pattern, which would allow a user to identify the exact portion of the transparent member 14 that has been compromised.

In the embodiment shown in FIG. 1, the conductive member 16 extends around substantially the entire outer periphery of the transparent member 14. The conductive member 16 also has a first termination surface 18 and a second termination surface 20. The distance or gap between the first termination surface 18 and the second termination surface 20 should be sufficient to prevent any descriptive electrical field communication between the termination surfaces 18 and 20.

In the non-limiting embodiment illustrated in FIG. 1, the rupture detector 10 includes an electrical power source 22 in electronic communication with the conductive member 16. The power source 22 can be any conventional electrical source, such as, but not limited to, a battery, an electrical generator, and the like. This electrical power source 22 applies an electrical potential to the conductive member 16. Further, the rupture detector 10 includes an electrical measurement mechanism 24, such as, but not limited to, an ohmmeter, in communication with the conductive member 16 for measuring the electrical potential of the conductive member 16. A control mechanism 26, such as, but not limited to, a personal computer, is used to control and communicate with both the electrical power source 22 and the electrical measurement mechanism 24. This control mechanism 26 can be used to command the electrical power source 22 to provide a predetermined or specifically set electrical potential to the conductive member 16 and, after application, the control mechanism 26 can collect and/or calculate the electrical potential of the conductive member 16 via the electrical measurement mechanism 24. All of the electrical power source 22, the electrical measurement mechanism 24 and the control mechanism 26 can be combined in a single unit or instrument or can be individual units.

The electrical power source 22 applies a set voltage to the conductive member 16, as set or specified by the control mechanism 26. This set voltage, therefore, allows current to flow through the conductive member 16. The electrical measurement mechanism 24 is connected to the conductive member 16 through a first lead 28 and a second lead 30. The first lead 28 is connected to the first termination surface 18 and the second lead 30 is connected to the second termination surface 20. This connection allows the conductive member 16 to act as an electrical circuit when the electrical power source 22 applies an electrical potential.

The electrical measurement mechanism 24 reads or measures the current flowing through the conductive member 16 via the first lead 28 connected to the first termination surface 18 and the second lead 30 connected to the second termination surface 20. Since the electrical power source 22 is applying a set voltage, and the electrical measurement mechanism 24 is reading or measuring the current flowing through the conductive member 16, the electrical measurement mechanism 24 (or the control mechanism 26) is able to calculate and output the resistance value of the circuit (the conductive member 16). See FIG. 4.

Figure 6:
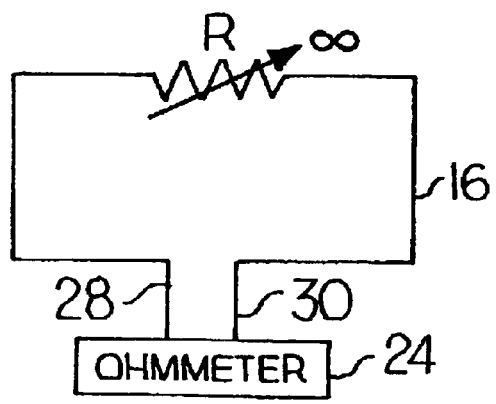
FIG. 6 is a schematic view of the electrical measurement device of FIG. 4 calculating resistance for a conductive member of the rupture detector during a rupture condition.

When a rupture or crack occurs and propagates in the transparent member 14, it will eventually reach the conductive member 16. As the crack begins to move through and break a section of the conductive member 16, the resistance value calculated by either the electrical measurement mechanism 24 or the control mechanism 26 begins to increase. This resistance value increase indicates a rupture or crack in the transparent member 14. As seen in FIG. 6, when the crack fully traverses and breaks the conductive member 16, the resistance value reaches infinity and indicates a serious rupture condition.

The rupture detector 10 can also include an alarm mechanism 32 in communication with either the electrical measurement mechanism 24 or the control mechanism 26. This alarm mechanism 32 initiates an alarm action based upon the measured or calculated electrical potential, e.g., the calculated resistance, of the conductive member 16. Any typical alarm action can be initiated, for example a visual alarm (blinking light or graphic display), an audio alarm (through a speaker), or a combination of the two types. The alarm mechanism 32 also can indicate the extent of the rupture condition, depending upon the movement of the crack across the conductive member 16, resulting in an increasing resistance value.

The conductive member 16 can be a conductive coating material formed from any suitable electrically conductive material, such as a metal, metal oxide, a semi-metal, an alloy, or other composite material. The conductive member 16 can also be opaque or transparent. Further, the conductive member 16 can be a conductive coating material formed from a ceramic paint or electrically conductive ink. The conductive material must be a material that will crack or separate when the transparent member 14 cracks or must otherwise change in its electrical properties in a manner that allows for detection of a change. In order to minimize costs, intrusion and opacity, the conductive member 16 can be deposited on a surface of the transparent member 14 through conventional thin film deposit methods or conventional thick film deposit methods. Alternatively, the conductive member 16 can be applied to a surface of the transparent member 14 using conventional adhesion manufacturing methods. Still further, the conductive member 16 can be deposited on the transparent member 14 by a screening or other similar process. In one embodiment, the conductive member 16 is a conductive coating formed from indium tin oxide.

Figure 2:
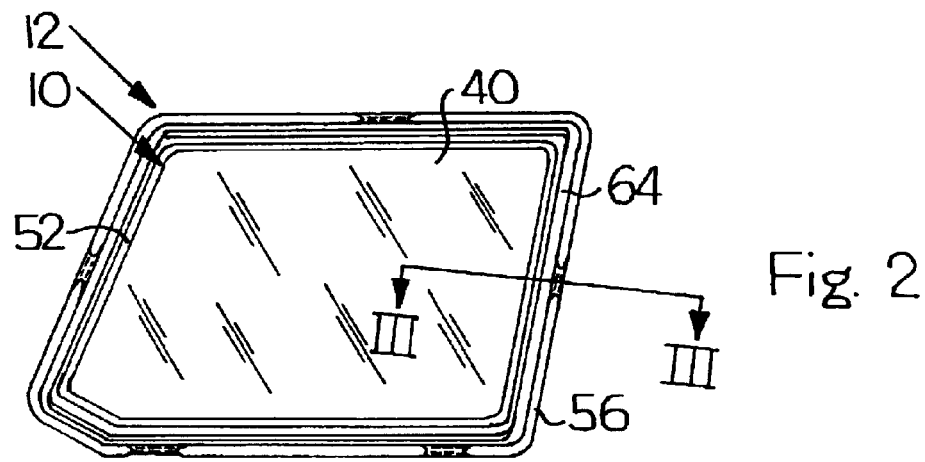
FIG. 2 an elevational view of the windshield assembly of FIG. 1 with a further embodiment of a rupture detector incorporating features of the present invention.
Figure 3:
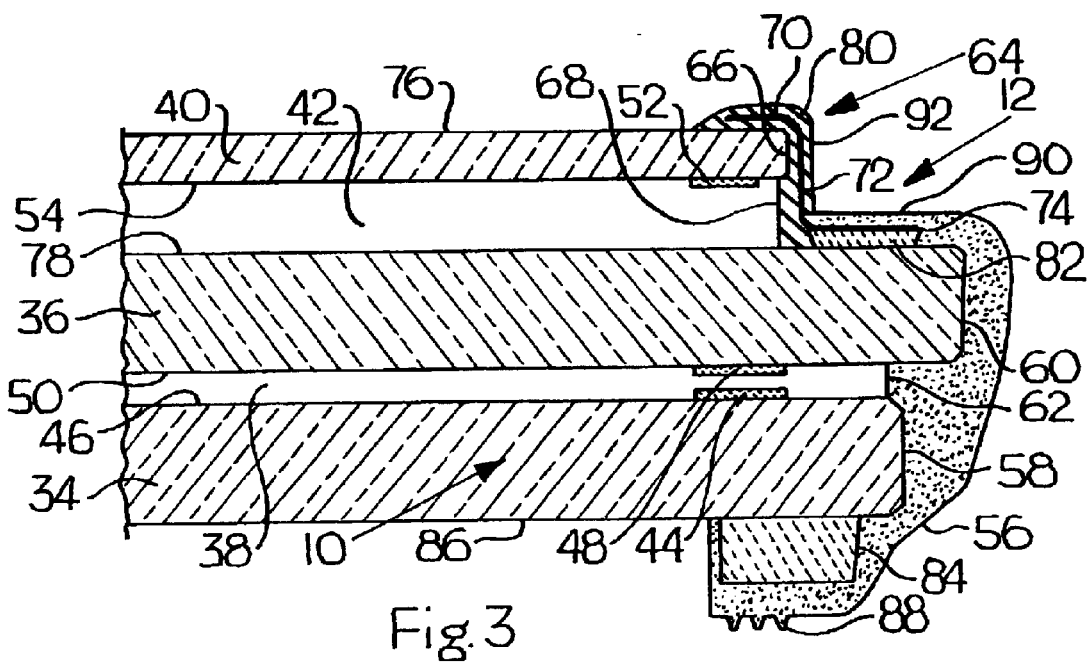
FIG. 3 is a sectional view of the windshield assembly and the rupture detector taken at section III—III of FIG. 2.
Figure 4:
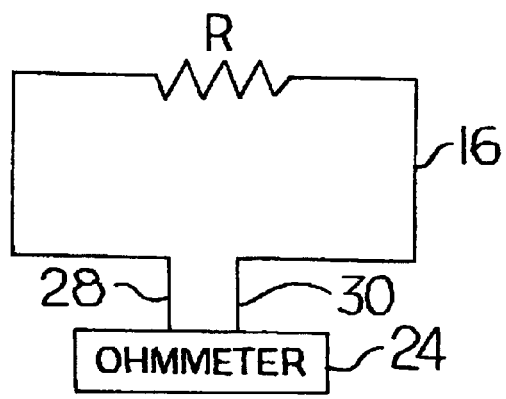
FIG. 4 is a schematic view of an exemplary electrical measurement device to calculate resistance for a conductive member of a rupture detector of the invention.

In the non-limiting embodiment illustrated in FIGS. 2 and 3, the windshield assembly 12 is a laminate, including a first transparent member 34 attached to a second transparent member 36 via a first transparent interlayer 38. Further and although not required, the windshield assembly 12 can include a third transparent member 40 attached to the second transparent member 36 via a second transparent interlayer 42, e.g. by lamination or other well known process, as shown in FIG. 3. This use of multiple transparent members (34, 36, 40) and transparent interlayers (38, 42) strengthens the structural integrity of the overall windshield assembly 12. The first transparent member 34, the second transparent member 36, the third transparent member 40, the first transparent interlayer 38 and the second transparent interlayer 42 are manufactured from glass, plastic, polycarbonate, acrylic resin, polyester, rigid transparent polyurethane, polyvinylbutyral or other similar materials commonly known to those skilled in the art.

In this non-limiting exemplary embodiment, as illustrated in FIG. 3, a first conductive member 44 of the rupture detector 10 is attached to a first transparent member outer surface 46, a second conductive member 48 of the rupture detector 10 is attached to a second transparent member inner surface 50, and a third conductive member 52 of the rupture detector 10 is attached to a third transparent member inner surface 54. One or multiple electrical power sources 22 (not shown in FIG. 3) apply an electrical potential, in this case a set voltage, to each of the first conductive member 44, the second conductive member 48 and the third conductive member 52. Similarly, one or multiple electrical measurement mechanisms 24 (not shown in FIG. 3) can be used to read and measure the electrical potential or current flowing through each conductive member (44, 48, 52).

Figure 5:
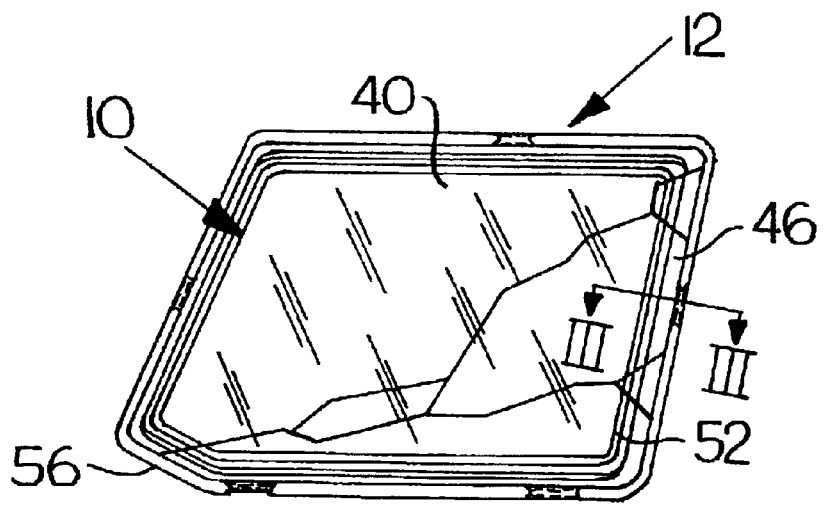
FIG. 5 is an elevational view of the windshield assembly and the rupture detector of FIG. 2 during a rupture condition.

The control mechanism 26 and/or the central or multiple dedicated electrical measurement mechanisms 24 are equipped to identify each individual conductive member (44, 48, 52) and calculate the electrical potential (resistance value) for each conductive member (44, 48, 52). In this manner, the vehicle operator receives an indication from the alarm mechanism 32 of the existence and extent of a rupture in each of the transparent members (34, 36, 40) due to the breaking or bridging of the associated conductive member (44, 48, 52). As seen in FIG. 5, during a rupture condition, it typically proves difficult to decipher which ply or transparent member (34, 36, 40) has been ruptured or cracked, and the use of multiple conductive members (44, 48, 52) allows the individual to identify the precise source of the failure condition.

As seen in FIG. 3, the conductive members (44, 48, 52) can be embedded in the transparent interlayers (38, 42), as long as the first conductive member 44 is in contact with the first transparent member outer surface 46 in a manner that will break or disrupt member 44 in the event that surface 46 of transparent member 34 cracks, the second conductive member 48 is in contact with the second transparent member inner surface 50 in a manner that will break or disrupt member 48 in the event that surface 50 of transparent member 36 cracks, and the third conductive member 52 is in contact with the third transparent member inner surface 54 in a manner that will break or disrupt member 52 in the event that surface 54 of transparent member 40 cracks. In this non-limiting embodiment, the portion of the first conductive member 44 and the second conductive member 48 not in contact with surfaces 46 and 50 respectively, is embedded in the first transparent interlayer 38, and the portion of the third conductive member 52 that is not in contact with surface 54 is embedded in the second transparent interlayer 42. The conductive members (44, 48, 52) can be positioned and aligned within the windshield assembly such that an opaque section of the windshield assembly 12 is minimized and the viewable or transparent area is maximized. Further, the conductive members (44, 48, 52) can be positioned on either side of the transparent members (34, 36, 40), again, contact as discussed above being the only requirement.

With continued reference to the non-limiting embodiment shown in FIG. 3, when used in connection with a "plug in" or clamp-type windshield assembly, the windshield assembly 12 includes an edge member 56, which surrounds a first transparent member edge 58, a second transparent member edge 60 and a transparent interlayer edge 62. This edge member 56 is engageable with a vehicle frame section (not shown) on a vehicle (not shown). In one non-limiting embodiment, the vehicle frame section is an airframe in an aircraft. Although not limiting in the present invention, the edge member 56 may be formed from a material, such as, but not limited to, a silicone rubber or other flexible yet durable material.

In order to provide a securement area or lip for a clamp-type windshield assembly, an attachment mechanism 64 can be utilized. Specifically, the attachment mechanism 64 is attached to a third transparent member edge 66 and a second transparent interlayer edge 68 via a clamping action, adhesive or other method of fixation. When attached, the attachment mechanism 64 secures the third transparent member 40 and, therefore, the second transparent interlayer 42 to the vehicle frame. In one non-limiting embodiment, the attachment mechanism 64 is manufactured from a rigid material, such as, but not limited to, stainless steel.

The attachment mechanism 64 in the non-limiting embodiment of the invention shown in FIG. 3 includes a first attachment mechanism portion 70, a second attachment mechanism portion 72 and a third attachment mechanism portion 74, and is commonly referred to as a "Z-bar." The attachment mechanism 64 extends around at least a portion of the windshield assembly 12 outer periphery. In one non-limiting embodiment, the attachment mechanism 64 extends around the entire outer periphery of the windshield assembly. The first attachment mechanism portion 70 is secured to a third transparent member outer surface 76, the second attachment mechanism portion 72 is secured to the third transparent member edge 66 and the second transparent interlayer edge 68, and the third attachment mechanism portion 74 is secured to a second transparent member outer surface 78. The edge member 56 further secures the attachment mechanism 64 by securing at least the third attachment mechanism portion 74 to the second transparent member outer surface 78.

An attachment mechanism seal element 80 is disposed around at least a portion of the attachment mechanism 64. This attachment mechanism seal element 80 prevents the infiltration of moisture and ensures air-tightness in the windshield assembly 12. The attachment mechanism seal element 80 acts to prevent direct contact between at least a portion of the attachment mechanism 64 and at least one of the third transparent member outer surface 76, third transparent member edge 66, second transparent interlayer edge 68, and second transparent member outer surface 54, preventing scratching and/or chipping of the third transparent member outer surface 76, third transparent member edge 66, second transparent interlayer edge 68, and second transparent member outer surface 54. Without limiting in the present invention, the attachment mechanism seal element 80 can be a material, such as, but not limited to, a polysulfide or other similar sealant.

An attachment mechanism spacer element 82 is disposed between the third attachment mechanism portion 74 and the second transparent member outer surface 78. The attachment mechanism spacer element 82 acts to prevent direct contact between the rigid attachment mechanism 64 and the second transparent member outer surface 78, preventing scratching and/or chipping of the second transparent member outer surface 78. Although not limiting in the present invention, the attachment mechanism spacer element 82 can be manufactured from materials, such as, but not limited to, phenolics or other similar compounds.

An edge member spacer element 84 is disposed between the edge member 56 and the first transparent member inner surface 86. The edge member spacer element 84 is used to provide sufficient rigidity to the overall structure of the edge member 56 and, further, to provide an adjustability function for using the edge member 56 with different windshield dimensions.

Although not required, the edge member 56 can also include a gasket element 88 configured to frictionally engage a vehicle frame wall (not shown). The gasket element 88 engages the edge member 56 with the vehicle frame and also prevents moisture infiltration between the edge member 56 and the vehicle frame. In one non-limiting embodiment, the gasket member 88 is integrally formed with the edge member 56.

To further secure the edge member 56 to the vehicle frame, another vehicle frame wall (not shown) engages the edge member 56 and the attachment mechanism 64, for example, along surface 90 of edge member 56 and surface 92 of seal element 80. These attachments act to firmly and safely clamp the windshield assembly 12 to the vehicle frame and, thus, the vehicle (not shown).

The first transparent member 34, the second transparent member 36, the third transparent member 40, the first transparent interlayer 38 and the second transparent interlayer 42 are materials selected from glass, plastic, polycarbonate, acrylic resin, polyester, rigid transparent polyurethane, polyvinylbutyral or other similar materials. The first transparent member 34, the second transparent member 36 and the third transparent member 40, as well as the first transparent interlayer 38 and the second transparent interlayer 42, can be constructed from one or multiple plies or layers of material. When multiple plies are used, the rupture detector 10 can be embedded and laminated between two of the plies in a manner as discussed earlier, simplifying the method of manufacture.

Overall, the present invention provides a rupture detector 10, which accurately identifies a rupture condition as it occurs. The rupture detector 10 detects a break or rupture in a windshield assembly 12 layer during a failure condition, resulting from environmental or physical impact. Further, the rupture detector 10 can include multiple conductive members (44, 48, 52) in order to detect a break or rupture individually for multiple layers in a windshield assembly 12 or different portions of a single transparent member 14.

While described in connection with "plug-in" or clamp-type windshield assemblies, the rupture detector 10 is equally useful in connection with any windshield assembly 12.

This invention has been described with reference to the preferred embodiments. Obvious modifications and alterations will occur to others upon reading and understanding the preceding detailed description. It is intended that the invention be construed as including all such modifications and alterations.

What is claimed is:

1. A rupture detector for detecting a rupture of at least one transparent member of a windshield assembly, the rupture detector comprising:

an electrically conductive member directly attached to at least a portion of the at least one transparent member;

an electrical power source in communication with the conductive member and configured to apply an electrical potential to the conductive member; and an electrical measurement mechanism in communication with the conductive member and configured to measure the electrical potential of the conductive member, wherein the electrically conductive member is in the form of a strip of material.

2. The rupture detector of claim 1, further comprising a control mechanism in communication with at least one of the electrical power source and the electrical measurement mechanism and configured to control the at least one of the electrical power source and the electrical measurement mechanism.

3. The rupture detector of claim 1, wherein the electrical power source is capable of applying a voltage to the conductive member, thereby allowing current to flow through the conductive member, and the electrical measurement mechanism is capable of measuring the current flowing through the conductive member and calculating and outputting a conductive member resistance value.

4. The rupture detector of claim 1, further comprising an alarm mechanism in communication with the electrical measurement mechanism and configured to initiate an alarm action based upon the measured electrical potential of the conductive member.

5. The rupture detector of claim 1, wherein the conductive member includes a gap formed by a conductive member first termination surface and a conductive member second termination surface.

6. The rupture detector of claim 5, further comprising a first lead attached to the conductive member first termination surface; and a second lead attached to the conductive member second termination surface, wherein the first lead and the second lead are in communication with the electrical measurement mechanism.

7. The rupture detector of claim 1, wherein the conductive member is selected from metal, semi-metal, alloy, composite material and mixtures thereof.

8. The rupture detector of claim 1, wherein the conductive member is deposited on a surface of the at least one transparent member through one of thin film depositing or thick film depositing.

9. The rupture detector of claim 1, wherein the windshield assembly further comprises a plurality of transparent members having transparent interlayers disposed therebetween, the rupture detector comprising:

a plurality of conductive members, each of the plurality of conductive member attached to at least a portion of each of the plurality of transparent members, wherein the electrical power source is in communication with the plurality of conductive members and configured to apply an electrical potential to the plurality of conductive members, and wherein the electrical measurement mechanism is in communication with the plurality of conductive members and configured to measure the electrical potential of the plurality of conductive members.

10. The rupture detector of claim 1, wherein the windshield assembly further comprises a first transparent member, a second transparent member and a transparent interlayer disposed between the first transparent member and the second transparent member.

11. The rupture detector of claim 1, further comprising:

a first conductive member attached to at least a portion of a first transparent member; and a second conductive member attached to at least a portion of a second transparent member, wherein the electrical power source is in communication with the first conductive member and the second conductive member and configured to apply an electrical potential to the first conductive member and the second conductive member, and wherein the electrical measurement mechanism is in communication with the first conductive member and the second conductive member and configured to measure the electrical potential of the first conductive member and the second conductive member.

12. The rupture detector of claim 1, wherein the first transparent member, the second transparent member and the transparent interlayer are each selected from glass, plastic, polycarbonate, acrylic resin, polyester, rigid transparent polyurethane and polyvinylbutyral.

13. The rupture detector of claim 1, wherein at least one of the first transparent member, the second transparent member and the transparent interlayer are formed from multiple plies.

14. The rupture detector of claim 1, wherein the at least one transparent member has a transparent member outer periphery and the conductive member extends around at least a portion of the at least one transparent member outer periphery.

15. The rupture detector of claim 1, further comprising a plurality of conductive members attached to at least a portion of the at least one transparent member.

16. The rupture detector of claim 1, wherein the electrically conductive member is transparent.

17. A windshield assembly, comprising:

at least one transparent member;

a conductive member directly attached to at least a portion of the at least one transparent member;

an electrical power source in communication with the conductive member and configured to apply an electrical potential to the conductive member; and an electrical measurement mechanism in communication with the conductive member and configured to measure the electrical potential of the conductive member, wherein the electrically conductive member is in the form of a strip of material.

18. The windshield assembly of claim 17, further comprising a control mechanism in communication with at least one of the electrical power source and the electrical measurement mechanism and configured to control the at least one of the electrical power source and the electrical measurement mechanism.

19. The windshield assembly of claim 17, wherein the electrical power source is capable of applying a voltage to the conductive member, thereby allowing current to flow through the conductive member, and the electrical measurement mechanism is capable of measuring the current flowing through the conductive member and calculating and outputting a conductive member resistance value.

20. The windshield assembly of claim 17, further comprising an alarm mechanism in communication with the electrical measurement mechanism and configured to initiate an alarm action based upon the measured electrical potential of the conductive member.

21. The windshield assembly of claim 17, wherein the conductive member includes a gap formed by a conductive member first termination surface and a conductive member second termination surface.

22. The windshield assembly of claim 21, further comprising:
a first lead attached to the conductive member first termination surface; and
a second lead attached to the conductive member second termination surface,
wherein the first lead and the second lead are in communication with the electrical measurement mechanism.

23. The windshield assembly of claim 17, wherein the conductive member is selected from metal, semi-metal, alloy, composite material and mixtures thereof.

24. The windshield assembly of claim 17, wherein the conductive member is deposited on a surface of the at least one transparent member through one of thin film depositing or thick film depositing.

25. The windshield assembly of claim 17, further comprising a plurality of transparent members having transparent interlayers disposed therebetween, the rupture detector comprising:
a plurality of conductive members, each of the plurality of conductive members attached to at least a portion of each of the plurality of transparent members,
wherein the electrical power source is in communication with the plurality of conductive members and configured to apply an electrical potential to the plurality of conductive members, and
wherein the electrical measurement mechanism is in communication with the plurality of conductive members and configured to measure the electrical potential of the plurality of conductive members.

26. The windshield assembly of claim 17, further comprising a first transparent member, a second transparent member and a transparent interlayer disposed between the first transparent member and the second transparent member.

27. The windshield assembly of claim 17, further comprising an edge member at least partially surrounding an outer edge of the first transparent member, an outer edge of the second transparent member and an outer edge of the transparent interlayer, the edge member configured to engage a vehicle frame.

28. The windshield assembly of claim 27, further comprising:
a first conductive member attached to at least a portion of a first transparent member; and
a second conductive member attached to at least a portion of a second transparent member,
wherein the electrical power source is in communication with the first conductive member and the second conductive member and configured to apply an electrical potential to the first conductive member and the second conductive member, and
wherein the electrical measurement mechanism is in communication with the first conductive member and the second conductive member and configured to measure the electrical potential of the first conductive member and the second conductive member.

29. The windshield assembly of claim 27, wherein the first transparent member, the second transparent member and the transparent interlayer are each selected from glass, plastic, polycarbonate, acrylic resin, polyester, rigid transparent polyurethane and polyvinylbutyral.

30. The windshield assembly of claim 27, wherein at least one of the first transparent member, the second transparent member and the transparent interlayer are formed from multiple plies.

31. The windshield assembly of claim 17, wherein the at least one transparent member has a transparent member outer periphery and the conductive member extends around at least a portion of the at least one transparent member outer periphery.

32. The windshield assembly of claim 17, further comprising a plurality of conductive members attached to at least a portion of the at least one transparent member.

33. The window assembly of claim 17, wherein the electrically conductive member is transparent.

34. A method of detecting a rupture condition of at least one transparent member of a windshield assembly, the method comprising the steps of:
(a) attaching a conductive member directly to the at least one transparent member;
(b) applying an electrical potential to the conductive member;
(c) measuring the electrical potential of the conductive member; and
(d) detecting a rupture condition based upon the value of the measured electrical potential of the conductive member,
wherein the electrically conductive member is in the form of a strip of material.

35. A rupture detector for detecting a rupture of at least one transparent member of a windshield assembly comprising a plurality of transparent members having transparent interlayers disposed therebetween, the rupture detector comprising:
a plurality of electrically conductive members, each of the plurality of conductive members attached to at least a portion of each of the plurality of transparent members;
an electrical power source in communication with the plurality of conductive members and configured to apply an electrical potential to the plurality of conductive members; and
an electrical measurement mechanism in communication with the plurality of conductive members and configured to measure the electrical potential of the plurality of conductive members.

36. A rupture detector for detecting a rupture of at least one transparent member of a windshield assembly comprising a first transparent member and a second transparent member, the rupture detector comprising:
a first electrically conductive member attached to at least a portion of the first transparent member;
a second electrically conductive member attached to at least a portion of the second transparent member;
an electrical power source in communication with the first conductive member and the second conductive member and configured to apply an electrical potential to the first conductive member and the second conductive member; and an electrical measurement mechanism in communication with the first conductive member and the second conductive member and configured to measure the electrical potential of the first conductive member and the second conductive member.

37. A windshield assembly, comprising:

a plurality of transparent members having transparent interlayers disposed therebetween;

a plurality of electrically conductive members, each of the plurality of conductive members attached to at least a portion of each of the plurality of transparent members;

an electrical power source in communication with the plurality of conductive members and configured to apply an electrical potential to the plurality of conductive members; and an electrical measurement mechanism in communication with the plurality of conductive members and configured to measure the electrical potential of the plurality of conductive members.

38. A windshield assembly, comprising:

a first transparent member;

a second transparent member;

a transparent interlayer;

an edge member at least partially surrounding an outer edge of the first transparent member, an outer edge of the second transparent member and an outer edge of the transparent interlayer, the edge member configured to engage a vehicle frame;

a first electrically conductive member attached to at least a portion of the first transparent member;

a second electrically conductive member attached to at least a portion of the second transparent member;

an electrical power source in communication with the first conductive member and the second conductive member and configured to apply an electrical potential to the first conductive member and the second conductive member; and an electrical measurement mechanism in communication with the first conductive member and the second conductive member and configured to measure the electrical potential of the first conductive member and the second conductive member.

* * * * *